Figure 1:
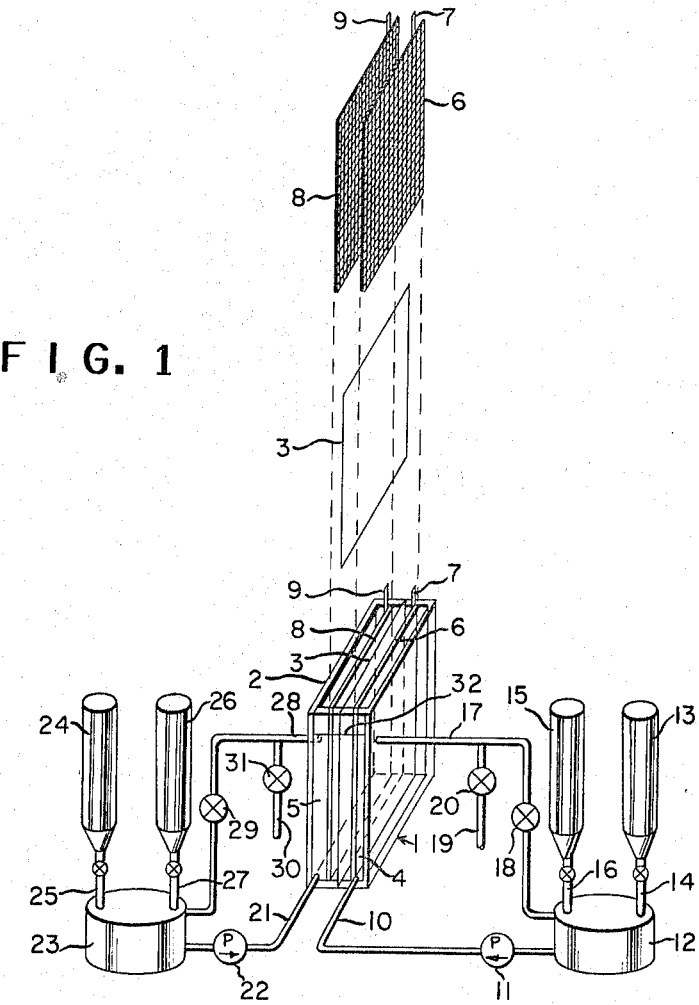

Nov. 8, 1966  E. V. KRING  3,284,240
CELLS FOR GENERATING ELECTRICAL ENERGY EMPLOYING A HYDROGEN
PEROXIDE ELECTROLYTE IN CONTACT WITH AN IMPROVED
PLATINUM ELECTRODE
Filed Dec. 20, 1962

INVENTOR
ELBERT V. KRING

BY
AGENT

United States Patent Office 3,284,240
Patented Nov. 8, 1966

3,284,240
CELLS FOR GENERATING ELECTRICAL ENERGY EMPLOYING A HYDROGEN PEROXIDE ELECTROLYTE IN CONTACT WITH AN IMPROVED PLATINUM ELECTRODE
Elbert V. Kring, Wilmington, Del., assignor to E. I. du Pont de Nemours and Company, Wilmington, Del., a corporation of Delaware
Filed Dec. 20, 1962, Ser. No. 246,244
6 Claims. (Cl. 136—86)

This invention relates to electrolytic cells, including fuel cells, whose operation to generate electrical energy involves the reduction of a peroxygen compound such as hydrogen peroxide at a catalytically active electrode. More particularly, the invention relates to an improved electrode for such cells and to a method of producing such an electrode.

Platinum-surfaced electrodes have been proposed for hydrogen peroxide half cells, e.g., in fuel cells, the purpose of the platinum surface being to catalyze the desired electrochemical reduction of the peroxide at the electrode, which, in an acidic electrolyte may be represented as follows:

$$H_2O_2 + 2H^+ + 2e^- = 2H_2O$$

Platinum surfaces which are active for the above purpose, i.e., which effectively catalyze such electrochemical reduction of a peroxygen compound at the electrode, are hereinafter referred to as "active" platinum surfaces.

Active platinum surfaces are readily prepared by the electrodeposition of platinum onto an electroconductive electrode base material by well-known plating methods. Active platinum surfaces have also been obtained by the application of a platinum black-polymeric binder composition by brush or dip methods to an electrode base material.

While platinum-surfaced electrodes prepared as indicated above are "active," i.e., they effectively catalyze the electrochemical reduction of hydrogen peroxide at the electrode, they also very actively catalyze the wasteful decomposition of hydrogen peroxide to water and molecular oxygen according to the equation:

$$2H_2O_2 = 2H_2O + O_2$$

It is an object of the invention to provide an improved electrode for use in an electrolyte containing a peroxygen compound in cells of the above type. A further object is the provision of an electrode having an active platinum surface for use in an electrolyte containing a peroxygen compound in cells of the above type, which platinum surface has been treated so as to reduce substantially its activity in catalyzing the wasteful decomposition of the peroxygen compound to yield molecular oxygen, without significantly reducing its effectiveness in catalyzing the electrochemical reduction of the peroxygen compound at the electrode. Another object is to provide a fuel cell employing an electrode having an active platinum surface which has been so treated as the cell cathode in an acidic catholyte containing a peroxygen compound dissolved therein. Still further objects of the invention will be apparent from the following description.

The improved electrode of the invention will be the cathode in, for example, a fuel cell employing an acidic catholyte containing a peroxygen compound such as hydrogen peroxide. The improved cathode is one having an active platinum surface which has been treated so as to render the platinum surface to be exposed to the catholyte more selective in its activity. Because the effect of the treatment is to reduce substantially the activity of the platinum surface to catalyze the wasteful decomposition of the peroxygen compound without substantially reducing its effectiveness in catalyzing the desired electrochemical reduction of the peroxygen compound at the cathode, the treatment may be regarded as a selective passification treatment.

The treatment by which the improved electrode is obtained can be applied effectively to any electrode having an active platinum surface. Most generally it will be applied to an electrode having an active black or gray platinum coating which has been formed on an electroconductive electrode base material by electrodeposition from a chloroplatinic acid or platinum salt plating bath. The treatment involves heating the active platinum surface to a temperature of at least 200° C. in an atmosphere containing molecular oxygen. Temperatures below 200° C. are generally too low to be effective, while temperatures substantially above about 1200° C. will generally not be employed. The preferred temperatures range from about 260° to 800° C.

The heat treatment will be continued until the activity of the platinum surface to catalyze the wasteful decomposition of the peroxygen compound to produce molecular oxygen has been reduced substantially. The time required to accomplish this is dependent upon the specific temperature employed in the heat treatment (a lower temperature generally requiring a longer time than a higher temperature), to some extent upon the specific platinum surface being treated, to some extent upon the oxygen content of the atmosphere employed, and also upon the degree of selective passivation desired. A heating time as short as five minutes, particularly at the higher temperatures, will generally effect selective passivation to a worthwhile extent, but a time of from about 1 to about 30 hours at the preferred temperatures will generally be employed. Still longer times, e.g., up to 100 hours and longer can be used.

The atmosphere in which the heat treatment is effected should contain free, i.e., molecular, oxygen at a concentration of at least 1% by volume. An atmosphere of substantially pure oxygen can be used but is not preferred for cost reasons since ordinary air appears to be just as effective and will most generally be employed. The atmosphere employed will consist essentially of molecular oxygen and should therefore be essentially free of substances which may adversely affect the electrode. The presence of inert gaseous materials such as nitrogen is not excluded.

The platinum surface which is heat treated according to the invention must be an "active" platinum surface, i.e., one which catalyzes the desired electrochemical reduction of the peroxygen compound at the electrode. Most generally, the active platinum surface will be one which has been electrodeposited upon an electrode base material. The latter may be any solid electroconductive material which is resistant to the electrolyte in which it is to be used and will withstand the temperature and atmosphere to be employed in the passification treatment. Suitable electrode base materials include stainless steel, nickel, platinum, gold and titanium screens or plates, including porous plates and porous carbon.

The electrode base material may be provided with an active platinum surface in any desired manner, but most generally such surface will be provided by electrodeposition of a black or gray platinum coating upon the base material. Any of the well-known methods for electrodepositing platinum, e.g., from a chloroplatinic acid or a platinum salt plating bath, can be employed, since such methods all yield platinum deposits which effectively catalyze the electrochemical reduction of hydrogen peroxide at the cathode.

The improved electrode of the invention is employed in a fuel cell as the cathode in an acidic catholyte containing a peroxygen compound, which catholyte is separated by a suitable membrane from a corresponding acidic analyte containing a dissolved fuel and having positioned therein an anode which catalyzes oxidation of the fuel at the anode.

The acidic electrolyte, which will be common to the catholyte and anolyte, may be an aqueous solution of any protonic acid, i.e., any substance that gives hydronium ions ($H_3O^+$) in aqueous solution, which solution does not adversely affect the electrodes or the membrane, does not react with the peroxygen compound to destroy its oxidizing power, does not react with the fuel to destroy its reducing power, and in which the peroxygen compound and the fuel are soluble. Examples of such acids are sulfuric acid, phosphoric acid and aliphatic carboxylic acids such as those having 1 to 4 carbon atoms per molecule, e.g., formic, acetic and propionic acids. The preferred electrolytes are aqueous sulfuric acid solutions which are 0.1 to 10 and most preferably 1 to 10 molar with respect to the acid.

The peroxygen compound employed in the catholyte of such cells is most preferably hydrogen peroxide, although other peroxygen compounds such as performic acid, peracetic acid, Caro's acid ($H_2SO_5$), potassium peroxymonosulfate and sodium perborate can be used. The concentration of the peroxygen compound in the catholyte will generally be in the range of 0.01 to 20 molar, the preferred range being 0.5 to 1.5 molar.

Methanol is the preferred fuel and will generally be present in the anolyte at a concentration of from 0.003 to 7, preferably 0.2 to 0.5 molar. Other fuels that can be used are ethanol, the propanols, the butanols, allyl alcohol, ethylene glycol, glycerine, sucrose, formaldehyde, acetaldehyde and the like compounds.

The membrane which separates the catholyte from the anolyte of the cell must be permeable to hydronium ions but impermeable to the peroxygen compound and the fuel. It should also resist attack by the acidic electrolyte, the peroxygen compound and the fuel. Membranes of cation exchange materials containing functional carboxylic acid, phosphoric acid or sulfonic acid groups are suitable, and those of cation exchange materials having sulfonic acid groups attached to the aromatic nuclei of a copolymer of the styrene/divinylbenzene type are preferred. Permeable cation exchange membranes of the preferred type are well-known and are commercially available.

The anode of such a fuel cell may be any anode material which catalyzes the oxidation of the fuel at its surface during operation of the cell. Anodes having an electrodeposited platinum surface on an electroconductive base material are generally suitable.

Figure 2:
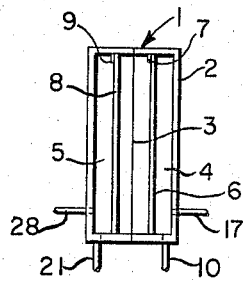

The accompanying drawing shows in FIG. 1 a perspective view of a fuel cell in which the improved electrode of the invention may be used, together with equipment for supplying materials to the cell. FIG. 2 is a top view of the cell of FIG. 1.

Referring to the drawing, cell 1 comprises a container 2 separated by membrane 3 into a catholyte compartment 4 and an anolyte compartment 5. Container 2 is constructed of a clear polymethylacrylate resin, although other materials such as glass which are nonconductors of electricity can be used. Membrane 3 is made of a nuclear sulfonated copolymer of styrene and divinylbenzene. Positioned within catholyte compartment 4 is cathode 6 provided with connector tab 7 and positioned within anolyte compartment 5 is anode 8 provided with connector tab 9. Cathode 6 and anode 8 are stainless steel screens provided with a black platinum electrodeposited coating. The screen structure of cathode 6 and anode 8 as well as their relative dimensions and those of membrane 3 are indicated more clearly by the showing of these parts in FIG. 1 in exploded form.

Catholyte comprising a solution of hydrogen peroxide in aqueous sulfuric acid is fed into the bottom of catholyte compartment 4 by way of feed line 10. Pump 11 serves to pump the catholyte from supply tank 12 through feed line 10 into catholyte compartment 4. Hydrogen peroxide supply vessel 13 having a valved bottom outlet 14 and acid supply vessel 15 having a valved bottom outlet 16 serve to supply hydrogen peroxide and aqueous sulfuric acid, respectively, to supply tank 12 where they are mixed, e.g., by means of a stirrer, not shown.

Spent or partially spent catholyte flows out of catholyte compartment 4 by way of line 17 which is provided with valve 18 and leads to supply tank 12 where the spent catholyte is mixed with fresh acid and peroxide. Leading off from line 17 is discard line 19 provided with valve 20. In operation, a cyclic flow of catholyte is established from supply tank 12 through pump 11, feed line 10, catholyte compartment 4 and back to supply tank 12 by way of line 17. Part of the spent catholyte is withdrawn from the cycle and discarded by way of discard line 19, the rate of discard being adjusted by means of valve 20. The rate of discard of spent catholyte from and the rates of feed of fresh acid and peroxide to the cycle should be adjusted and correlated to maintain the catholyte fed to catholyte compartment 4 at the desired substantially constant composition.

Anolyte comprising a solution of methanol in aqueous sulfuric acid is fed into the bottom of anolyte compartment 5 by way of feed line 21. Pump 22 serves to pump the anolyte from supply tank 23 through feed line 21 into anolyte compartment 5. Methanol supply vessel 24 having a valved bottom outlet 25 and acid supply vessel 26 having a valved bottom outlet 27 serve to supply methanol and aqueous sulfuric acid, respectively, to supply tank 23 where they are mixed, e.g., by means of a stirrer, not shown.

Spent or partially spent anolyte flows out of anolyte compartment 5 by way of line 28 which is provided with valve 29 and leads to supply tank 23 where the spent anolyte is mixed with fresh methanol and acid. Leading off from line 28 is discard line 30 provided with valve 31. The general level of electrolyte in the cell is indicated by line 32. In operation, a cyclic flow of anolyte is established from supply tank 23 through pump 22, feed line 21, anolyte compartment 5 and back to supply tank 23 by way of line 28. Part of the spent anolyte is withdrawn from the cycle by way of discard line 30, the rate of discard being adjusted by means of valve 31. The rate of discard of spent anolyte from and the rates of feed of fresh methanol and acid to the cycle should be adjusted and correlated to maintain the anolyte fed to anolyte compartment 5 at the desired substantially constant composition.

The invention is illustrated by the following examples in which all composition percentages are by weight unless indicated otherwise.

*Example 1*

A 400 mesh (U.S. standard screen scale) stainless steel screen 114 cm.² was cleaned in dilute sulfuric acid at room temperature, then plated in a 3% chloroplatinic acid solution at room temperature at 4 volts until an electrode having a uniform black platinum electrodeposited surface was obtained. The electrode was then subjected to a catalyst activity test to determine its activity in catalyzing the decomposition of $H_2O_2$ to water and molecular oxygen. The test involved allowing the electrode to stand for a given time at room temperature in a 5 molar sulfuric acid solution having a known starting concentration of hydrogen peroxide, e.g., 5% $H_2O_2$ by weight, analyzing the solution for $H_2O_2$ at the end of that time and calculating the amount of $H_2O_2$ that had been decomposed in the test period. It was found that the above electrode decomposed 98.0% of the peroxide in a test time of 45 minutes. The electrode was then heated in air at 343° C. for 15 minutes and again subjected to the catalyst activity test; this time, the peroxide decomposition loss in 45 minutes was 73.3%. After heating the electrode for 1 additional hour in air at 343° C., the peroxide decomposition loss in 45 minutes under the test conditions was reduced to only 3.5–4.0%.

Example 2

An electrode having an active black platinum surface was prepared by cleaning a 25 cm.$^2$ nickel sheet by dipping the sheet in concentrated hydrochloric acid, rinsing and then electroplating it in a 3% chloroplatinic acid solution. The open circuit potential of the resulting electrode in an acidic hydrogen peroxide half cell 5 molar with respect to sulfuric acid and containing 5% $H_2O_2$ was 900 millivolts versus the standard hydrogen electrode. When subjected to the catalyst activity test of Example 1, this electrode showed a peroxide decomposition value of 93.9%. After electrolysis using this electrode as the cathode for 1 hour, the electrode gave a peroxide decomposition value in the catalyst activity test of 95.8%, showing that reducing electrolytic conditions did not improve the electrode. After a first heat treatment in air for 2.5 hours at 260° to 370° C. in a muffle furnace, the peroxide decomposition test value for the electrode was reduced to 73.9%. After a second heat treatment in air for 17.25 hours at about 385° to 482° C., the peroxide decomposition test value was reduced to 13.2%. A third heat treatment in air at 482° C. for 15.5 hours reduced the peroxide decomposition value to 5.6%, and after a fourth heat treatment in air for 15.5 hours at 482° C., the electrode gave a peroxide decomposition value of only 3% in the catalyst activity test. All test periods in this series were 45 minutes.

The above electrode was employed initially, i.e., before any heat treatment, and after each of the third and fourth heat treatments described above, as the cathode in a hydrogen peroxide half cell operated at room temperature against a lead anode. The latter was employed in a 5 molar sulfuric acid anolyte which was separated from the catholyte solution of the hydrogen peroxide half cell by a cation exchange resin membrane. The catholyte, which was stirred during use, was a 5 molar sulfuric acid solution containing $H_2O_2$ at a 1 molar concentration. Polarization characteristics of the above cathode initially and after the third and fourth heat treatments are indicated by the following data:

| Current Density (ma./cm.$^2$) | Peroxide Half Cell Potential vs. $H_2$ (Millivolts) | | |
|---|---|---|---|
| | Cathode Initially | After Third Heat Treatment | After Fourth Heat Treatment |
| 0 | 940 | 880 | 900 |
| 2 | 930 | 870 | 890 |
| 10 | 910 | 850 | 860 |
| 20 | 880 | 810 | 810 |
| 40 | 850 | 780 | 770 |
| 80 | 740 | 670 | 590 |
| 152 | 510 | 440 | |

The above data considered together with the peroxide decomposition values reported previously for the catalyst activity test show that while the heat treatment very greatly reduced the activity of the cathode in catalyzing the wasteful decomposition of the peroxide, it reduced the desired electrochemical activity of the cathode only slightly.

Example 3

A piece of bright platinum sheet 13.7 cm.$^2$ was cleaned by dipping in chromic acid solution at 21° C. for 5 minutes, rinsed with water, then electroplated for 1 minute per side in a 3% chloroplatinic acid solution at 20 ma./cm.$^2$ at 1.6 volts, with the electrode being positioned 1 cm. from a dummy platinum electrode. The resulting electrode had a gray platinum surface. When tested in the catalyst activity test employing a 7% $H_2O_2$ solution in a 5 molar sulfuric acid solution, 56.9% of the peroxide was decomposed in 45 minutes. After the electroplated electrode had been heat-treated about 17 hours in air at 260° C., the corresponding peroxide decomposition value was 16%.

The above electrode was employed initially and after the heat treatment as the cathode in a hydrogen peroxide half cell operated at room temperature (25° C.) against a lead anode in an aqueous 5 molar sulfuric acid anolyte. The anolyte was separated from the catholyte of the peroxide half cell by a cation exchange resin membrane. The catholyte, which was stirred during use, was a 5 molar sulfuric acid solution containing 3% $H_2O_2$ by weight. Polarization characteristics of the cathode before and after the heat treatment are indicated by the following data:

| Current Density (ma./cm.$^2$) | Peroxide Half Cell Potential vs. $H_2$ (Millivolts) | |
|---|---|---|
| | Initially | After Heat Treatment |
| 0 | 880 | 870 |
| 3.6 | 870 | 870 |
| 14.7 | 870 | 860 |
| 25.5 | 860 | 850 |
| 36.5 | 850 | 840 |
| 73.0 | 820 | 800 |
| 94.5 | 800 | 800 |
| 146 | 770 | 750 |
| 291 | 670 | 540 |
| Open Circuit Cell Potential, v. | 1.17 | 1.06 |

The data of the above example show that while the heat treatment greatly decreased the activity of the cathode in catalyzing the wasteful decomposition of the peroxide, it reduced only slightly the activity of the cathode in catalyzing the electrochemical reaction necessary to the operation of the cell.

Example 4

A 4 cm.$^2$ platinum sheet electrode base was electroplated in a 3% by weight chloroplatinic acid solution. Each side was plated 1.5 minutes facing a dummy platinum electrode at 20 ma./cm.$^2$. The resulting electrode had an active light metallic gray platinum coating. When tested by the peroxide decomposition test using a 5 molar sulfuric acid solution containing 7.8% $H_2O_2$ by weight, the plated electrode gave a peroxide decomposition value of 12.6% in 45 minutes. After heating for 21 hours in air at 482° C., the corresponding peroxide decomposition value was 4.6%.

Example 5

An electrode comprising a platinum sheet having a black electrodeposited platinum coating was subjected prior to any heat treatment to the catalyst activity test using a 5 molar sulfuric acid solution containing 7.7% $H_2O_2$ by weight. It gave a peroxide decomposition value of 8% in 45 minutes. The corresponding peroxide decomposition test value after the electrode had been heated 17 hours in air at about 525° C. was 4.1%.

The above electrode was employed as cathode in a hydrogen peroxide half cell operated against a lead anode as described in Example 3. Polarization characteristics of the cathode initially and after the heat treatment are indicated by the following data:

| Current Density (ma./cm.$^2$) | Peroxide Half Cell Potential vs. $H_2$ (Millivolts) | |
|---|---|---|
| | Initially | After Heat Treatment |
| 0 | 900 | 920 |
| 25 | 890 | 910 |
| 100 | 840 | 860 |
| 200 | 780 | 800 |
| 400 | 670 | 700 |
| 500 | 570 | 630 |
| 700 | 300 | 450 |

The above data show that the heat treatment reduced the activity of the cathode in catalyzing the decomposition of the peroxide and increased somewhat the activity of the cathode in catalyzing the desired electrochemical reaction.

*Example 6*

A cathode having an electroplated platinum surface is prepared and heat-treated as described in Example 3. An anode is prepared the same way except that the heat treatment in air is omitted. A fuel cell as assembled employing the above cathode in a 5 molar sulfuric acid catholyte containing $H_2O_2$ at 1 molar concentration and the above anode in a 5 molar aqueous sulfuric acid anolyte containing methanol at 1 molar concentration. The catholyte and anolyte are separated from each other in the cell by a cation exchange membrane made of a nuclear sulfonated copolymer of styrene and divinylbenzene. Under open circuit condtions (no load), the cell potential is 520 millivolts. When the electrodes are connected externally through a variable resistance as load and the resistance of the load is varied over a range to give a cell current ranging from 1 to 400 ma., the following cell potentials are obtained at room temperature:

| Current (ma.): | Cell potential (millivolts) |
|---|---|
| 1 | 240 |
| 50 | 230 |
| 100 | 220 |
| 200 | 200 |
| 300 | 175 |
| 400 | 140 |

As indicated by the foregoing examples, some active platinum electroplated cathodes, prior to any heat treatment, give higher peroxide decomposition test values than do other active platinum electroplated cathodes. Such differences in original test values (i.e., before any heat treatment) is often due to differences in the roughness or porosity of the surface upon which the platinum coating is electrodeposited. Differences in plating conditions and the composition of the plating bath also result in differences in the test values. It has been found, however, that the heat treatment of an active platinum electroplated cathode in accordance with the invention reduces substantially the hydrogen peroxide decomposition test value for the cathode regardless of whether the original test value therefor is high or low.

The embodiments of the invention in which an exclusive property or privilege is claimed are as follows:

1. In a fuel cell for the generation of electrical energy, the combination therewith of an electrode in contact with an acidic electrolyte having dissolved therein a peroxygen compound, said electrode comprising an active platinum surface which has been heated to a temperature of at least 200° C. in an atmosphere comprising molecular oxygen.

2. In a fuel cell for the generation of electrical energy, the combination therewith of an electrode in contact with an acidic electrolyte having dissolved therein hydrogen peroxide, said electrode comprising an active platinum surface which has been heated for from 1 to 100 hours at a temperature of 200 to 1200° C. in an atmosphere containing molecular oxygen at a concentration of 1 to 100% by volume.

3. In a fuel cell, the combination therewith of an electrode in contact with an acidic catholyte having a peroxygen compound dissolved therein, said electrode comprising an active platinum surface which has been heated for 1 to 100 hours at a temperature of 200 to 1200° C. in an atmosphere containing molecular oxygen at a concentration of 1 to 100% by volume.

4. The combination according to claim 3, wherein the electrode comprises an electrodeposited platinum surface which has been heated in an atmosphere of air.

5. The combination according to claim 3 wherein the acidic catholyte is an aqueous solution of sulfuric acid having hydrogen peroxide dissolved therein.

6. The combination according to claim 3 wherein the acidic catholyte is a 0.1 to 10 molar aqueous sulfuric acid solution having dissolved therein hydrogen peroxide at a concentration of from 0.01 to 20 molar, and the electrode comprises an electrodeposited platinum surface which has been heated in an atmosphere of air.

References Cited by the Examiner

UNITED STATES PATENTS

| 233,847 | 9/1959 | Kordesch et al. | 136—86 |
| 2,921,110 | 1/1960 | Crowley et al. | 136—86 |
| 3,092,517 | 6/1963 | Oswin | 136—86 |
| 3,098,772 | 7/1963 | Taschek | 136—120 |

FOREIGN PATENTS

| 233,847 | 9/1959 | Australia. |

OTHER REFERENCES

Grimes et al.: Liquid Alkaline Fuel Cells, Proceedings of the 15th Annual Power Sources Conference, pp. 29–32, May 1961.

References Cited by the Applicant

| 2,706,213 | 4/1955 | Lucas. |
| 3,012,086 | 12/1961 | Vahldrick. |
| 3,013,098 | 12/1961 | Hunger et al. |

WINSTON A. DOUGLAS, *Primary Examiner.*

MURRAY TILLMAN, B. J. OHLENDORF,
*Assistant Examiners.*